(12) United States Patent
Bichot et al.

(10) Patent No.: US 9,232,264 B2
(45) Date of Patent: Jan. 5, 2016

(54) SYSTEM AND DEVICES FOR DISTRIBUTING CONTENT IN A HIERARCHICAL MANNER

(75) Inventors: Guillaume Bichot, La Chapelle Chaussee (FR); Christopher Howson, Corps-Nuds (FR)

(73) Assignee: THOMSON LICENSING, Issy les Moulineaux (FR)

( * ) Notice: Subject to any disclaimer, the term of this patent is extended or adjusted under 35 U.S.C. 154(b) by 366 days.

(21) Appl. No.: 12/736,886

(22) PCT Filed: May 14, 2009

(86) PCT No.: PCT/EP2009/055884
§ 371 (c)(1),
(2), (4) Date: Nov. 19, 2010

(87) PCT Pub. No.: WO2009/150006
PCT Pub. Date: Dec. 17, 2009

(65) Prior Publication Data
US 2011/0093910 A1 Apr. 21, 2011

(30) Foreign Application Priority Data

May 26, 2008 (EP) .................................... 08305198

(51) Int. Cl.
*H04N 7/173* (2011.01)
*H04N 21/435* (2011.01)
(Continued)

(52) U.S. Cl.
CPC ............. *H04N 21/435* (2013.01); *H04H 20/67* (2013.01); *H04N 21/235* (2013.01);
(Continued)

(58) Field of Classification Search
CPC ....... H04H 60/00; H04H 60/90; H04H 20/72; H04N 21/64315; H04N 21/235; H04N 21/23614; H04N 21/25841; H04N 21/4348; H04N 21/64322; H04N 21/2385
See application file for complete search history.

(56) References Cited

U.S. PATENT DOCUMENTS

2005/0232223 A1  10/2005  Muller
2006/0092867 A1  5/2006  Muller et al.
(Continued)

FOREIGN PATENT DOCUMENTS

CN          1571380        7/2003
DE       102005058709   *  6/2007
(Continued)

OTHER PUBLICATIONS

Berger et al., "Motivation and Implementation of a Software H.264 Real-Time CIF Encoder for Mobile TV Broadcast Applications", IEEE Transactions on Broadcasting, vol. 53, No. 2, Jun. 2007, pp. 584-587.
(Continued)

*Primary Examiner* — Rong Le
(74) *Attorney, Agent, or Firm* — Tutunjian & Bitetto, P.C.

(57) ABSTRACT

The present invention concerns a transmitting device adapted to send content in bursts in a channel, the channel comprising a plurality of bursts, wherein a burst comprises at least one time slot. The transmitting device comprises first communicating means for receiving content from a first network, second communicating means for sending the content to a second network, the content being successively sent over at least one time slot of the bursts of the channel, time slot means for assigning a channel, and at least one unfilled time slot in the bursts of the channel to at least one second transmitting device located on the second network and signaling means for indicating the channel and the unfilled time slots to the at least one second transmitting device.

40 Claims, 6 Drawing Sheets

(51) Int. Cl.

| | | |
|---|---|---|
| *H04H 20/67* | (2008.01) | |
| *H04N 21/235* | (2011.01) | |
| *H04N 21/236* | (2011.01) | |
| *H04N 21/2381* | (2011.01) | |
| *H04N 21/2385* | (2011.01) | |
| *H04N 21/258* | (2011.01) | |
| *H04N 21/434* | (2011.01) | |
| *H04N 21/61* | (2011.01) | |
| *H04N 21/643* | (2011.01) | |
| *H04H 20/72* | (2008.01) | |

(52) U.S. Cl.
CPC ...... *H04N 21/2381* (2013.01); *H04N 21/2385* (2013.01); *H04N 21/23614* (2013.01); *H04N 21/25841* (2013.01); *H04N 21/4348* (2013.01); *H04N 21/6112* (2013.01); *H04N 21/64315* (2013.01); *H04N 21/64322* (2013.01); *H04H 20/72* (2013.01)

(56) References Cited

U.S. PATENT DOCUMENTS

| 2007/0002871 A1* | 1/2007 | Pekonen et al. ......... 370/395.42 |
| 2007/0091857 A1* | 4/2007 | Elstermann ................ 370/338 |
| 2007/0266419 A1* | 11/2007 | Kim ........................ 725/135 |

FOREIGN PATENT DOCUMENTS

| GB | 420540 | 12/1934 |
| GB | 2406483 | 3/2005 |
| WO | WO2004066652 | 8/2004 |
| WO | WO2005034460 | 4/2005 |
| WO | WO2006031925 | 3/2006 |
| WO | WO2006070246 | 7/2006 |

OTHER PUBLICATIONS

The Search Report Dated Sep. 14, 2009.
ETSI EN 302 304 V1.1.1, "Digital video broadcasting (DVB); Transmission System for Handheld terminals (DVB-H)", European Standard Telecommunications series, Nov. 2004, pp. 1-14.
ETSI TR 1020 469 v1.1.1, "Digital video broadcasting (DVB); IP Datacast over DVB-H: architecture", European Standard Telecommunications series Technical Report, May 2006, pp. 1-38.
ETSI TR 101 190 V1.1.1, "Digital Video Broadcasting (DVB) Implementation guidelines for DVB terrestrial services: Transmission aspects", European Standard Telecommunications series Technical Report, Dec. 1997, pp. 1-77.
ETSI TR 102 377 v1.1.1, "Digital Video Broadcasting (DVB): DVB-H Implementation guidelines", European Standard Telecommunications series Technical Report, Feb. 2005, pp. 1-81.
ETSI EN 300 744 V1.5.1, "Digital Video Broadcasting (DVB); Framing structure, channel coding and modulation for digital terrestrial television (DVB-T)", European Standard Telecommunications series, Jun. 2004, pp. 1-64.
ETSI EN 301 192 V1.4.1, "Digital video broadcasting (DVB); DVB specification for data broadcasting", European Standard Telecommunications series, Nov. 2004, pp. 1-78.
Clerget et al., "DVB-H Mobile TV flexible satellite distribution", UDCAST, France, Jan. 2007, pp. 1-16.
IEEE Standard 802.11.-1997, "Telecommunications and information exchange between systems Local and metropolitan area networks—Specific requirements Part 11: Wireless LAN Medium Access Control (MAC) and Physical Layer (PHY) Specifications", IEEE Standard for Information technology, Jun. 26, 1997, pp. 1-459.
Jakel T., "Time slices-main characteristics of DVB-H", Fernseh-und kino-Technik, vol. 60, No. 3, Mar. 2005, pp. 135-138. English Abstract.
Schierl et al., "Video compression for integrated digital video broadcasting", ITG-Fachbericht, No. 188, 2005, pp. 65-70.
Kornfeld et al., "Digital video broadcasting for smart phones and personal digital assistants", Fernseh- und kino-Technik, vol. 59, No. 1-2, Jan. 2005, pp. 35-42.
Rezaei et al., "Spliced video and buffering considerations for tune-in-time minimization in DVB-H for mobile TV", 17th Annual IEEE International Symposium on Personal, Indoor and Mobile Radio Communications (PIMRC'06), Helsinki, Finland, Sep. 11, 2006, pp.
Rezaei et al., "Video encoding and splicing for tune-in-time reduction in IP datacasing (IPDC) over DVB-H", 2006 IEEE International Conference on Multimedia and Expo, Toronto, Canada, Jul. 9, 2006, pp. 601-604.

* cited by examiner

SYSTEM AND DEVICES FOR DISTRIBUTING CONTENT IN A HIERARCHICAL MANNER

This application claims the benefit, under 35 U.S.C. §365 of International Application PCT/EP09/055884, filed May 14, 2009, which was published in accordance with PCT Article 21(2) on Dec. 17, 2009 in English and which claims the benefit of European patent application No. 08305198.7, filed on May 26, 2008.

FIELD OF THE INVENTION

The present invention relates generally to content distribution and in particular to a flexible system for distributing content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The Digital Video Broadcasting-Terrestrial, noted DVB-T, is a standard for the transmission of digital terrestrial television. It is specified in the standard document ETSI EN 300 744: "Digital Video Broadcasting (DVB); Framing structure, channel coding and modulation for digital terrestrial television (DVB-T)".

Within the digital terrestrial TV context, DVB-H is a DVB-T extension for broadcast services distribution to mobile terminals, also called handheld terminals. DVB-H mainly defines means for reducing power consumption and increasing reliability. It is specified in the standard document ETSI EN 302 304 V1.1.1 (2004 November) "Digital Video Broadcasting (DVB); Transmission System for Handheld Terminals (DVB-H)". A difference brought by DVB-H over DVB-T is the fact that video and audio are transported in Internet Protocol packets, IP packets. The payload of DVB-H is constituted of IP datagram or other network layer datagram encapsulated into MultiProtocol Encapsulation sections. DVB-H introduces time-slicing in order to reduce the average power consumption of the terminal and to enable smooth and seamless frequency handover.

The time slicing technique is further described in ETSI standard, EN 301 192 V1.4.1 (2004 November) "Digital Video Broadcasting (DVB); DVB specification for data broadcasting". With the time-slicing mechanism the sender sends a burst using the highest possible bit rate to multiple receivers. Time-slicing consists in sending data in bursts using higher instantaneous bit rate compared to the bit rate required if the data were transmitted using traditional streaming mechanisms. A burst comprises multiple sections. To indicate to the receiver when to expect the next burst, the time to the beginning of the next burst, which is the delta-t, is indicated in each section of the burst.

Time-slicing enables a receiver to stay active only a fraction of the time, while receiving bursts of a requested service. Between bursts belonging to the same service/stream, a DVB-H receiver may switch off its reception unit in order to save power. Once tuned to a TV service for instance, a terminal saves up to eighty percent of power as compared to a DVB-T tuner where the reception unit is continuously on. The set of time-sliced bursts is referred to a DVB-H channel hereinafter. Time slicing then enables a receiver to select a DVB-H channel for receiving a service, and not to listen to the other DVB-H channels.

Increasing reliability is done using a Forward Error Correction (FEC) mechanism. Each service, such as video service, is associated to one section whereas the service guide information, metadata, may be sent through a dedicated section. The device that transmits content using the time slicing and FEC techniques is called an IP Encapsulator (IPE).

Figure 1:
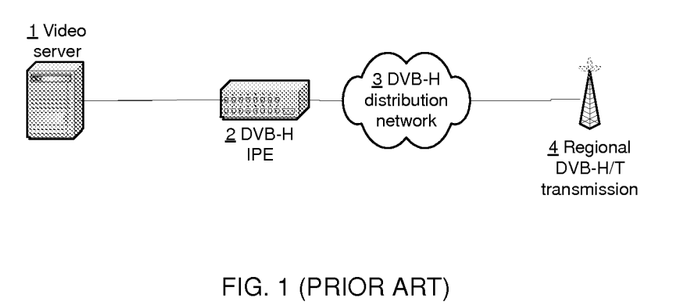
FIG. 1 is a prior art block diagram of a system compliant with DVB-H content distribution.

The FIG. 1 represents a DVB-H distribution system, compliant with the ETSI TR 102 469 V1.1.1 (2006 May), "Digital Video Broadcasting (DVB); IP Datacast over DVB-H: Architecture". It comprises a video content server 1 and a DVB-H IP Encapsulator (IPE) 2. The video content server is connected to the IPE in a manner well known to the skilled in the art of the DVB-H distribution system. The IPE sends the DVB-H content to the regional DVB-H transmission system 4 through the DVB-H distribution network 3. Only one IPE serves the entire network. The IPE is generally located in a national head-end office. Every DVB-H service is generated from this IPE including regional or local services.

An alternative DVB-H distribution system, not represented and described in the white paper "DVB-H Mobile TV flexible satellite distribution, UDcast, January 2007", is based on several IPEs distributed over a set of regional areas. The same content, under the form of IP streams, is sent to all IPEs that generate DVB-H stream locally. This requires a unique management system to synchronize all IPEs together. All the IPEs distribute the same content locally.

These two architectures are not optimized. Either it requires sending all the content and services to the centralized IPE before being distributed. Or, with a regional distribution, it is very difficult to have a synchronized national network. In any case, it is not possible to modify the DVB-H stream once it has been generated at the IPE.

SUMMARY OF THE INVENTION

The present invention attempts to remedy at least some of the concerns connected with content distribution in the prior art, by providing a system that permit to decentralize the content distribution with multiple IP encapsulators.

The present invention concerns a transmitting device adapted to send content in bursts in a channel, the channel comprising a plurality of bursts, wherein a burst comprises at least one time slot. The transmitting device comprises first communicating means for receiving content from a first network, second communicating means for sending the content to a second network, the content being successively sent over at least one time slot of the bursts of the channel, time slot means for assigning a channel, and at least one unfilled time slot in the bursts of the channel to at least one second transmitting device located on the second network and signaling means for indicating the channel and the unfilled time slots to the at least one second transmitting device.

The transmitting device is the first device in the hierarchy of transmitting devices. It receives content that it distributes in a channel to downstream transmitters that are below in the hierarchy. It also provides the opportunity to the downstream transmitters to insert content, by reserving and allocating time slots to the downstream transmitters. The content is then provided by various transmitting devices in the hierarchy. An operator may then distribute content at the national level to all the receivers, and provide local content to some receivers. Local content may then be different, according to the area in which the receiver is located.

Another object of the invention is a transmitting device adapted to send content in bursts in a channel, the channel comprising a plurality of bursts, wherein a burst comprises at least one time slot. The transmitting device comprises time slots means for being assigned a channel and at least one unfilled time slot in the bursts of the channel from a first transmitting device, and for assigning a first part of the at least one unfilled time slot to at least one second transmitting device, signaling means for indicating the channel and the part of the at least one unfilled time slot to the at least one second transmitting device, first communicating means for receiving first content from a first network and second communicating means for sending the content to a second network, the content being sent over a second part of the at least one unfilled time slot.

That transmitting is an intermediary device in the hierarchy. It receives time slots from a transmitting device. It can then either insert content and/or allocate time slots to other transmitting devices.

Another object of the invention is a transmitting device adapted to send content in bursts in a channel, the channel comprising a plurality of bursts, wherein a burst comprises at least one time slot. The transmitting device comprises time slots means for being assigned a channel and at least one unfilled time slot in the bursts of the channel from a first transmitting device, first Communicating means for receiving first content from a first network and second communicating means for sending the content to a second network, the content being sent over a second part of the at least one unfilled time slot.

That transmitting device is the last device in the hierarchy.

According to an embodiment, the transmitting device is a DVB-H IP Encapsulator, and the second network is DVB-H network.

According to an embodiment, the second communicating means transmits content using the DVB-H time slicing technique.

According to an embodiment, the first communicating means receive the first content over the Internet Protocol.

According to an embodiment, the second communicating means are adapted to receive content from a first transmitting device located on the first network, and to forward the content to the second network.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Figure 3:
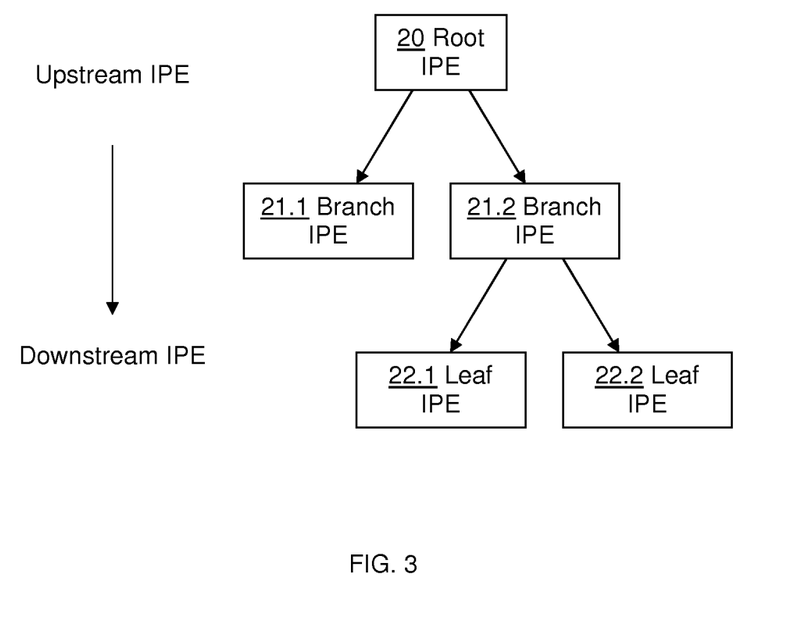
FIG. 3 is a block diagram of a system compliant with the embodiment.
Figure 6:
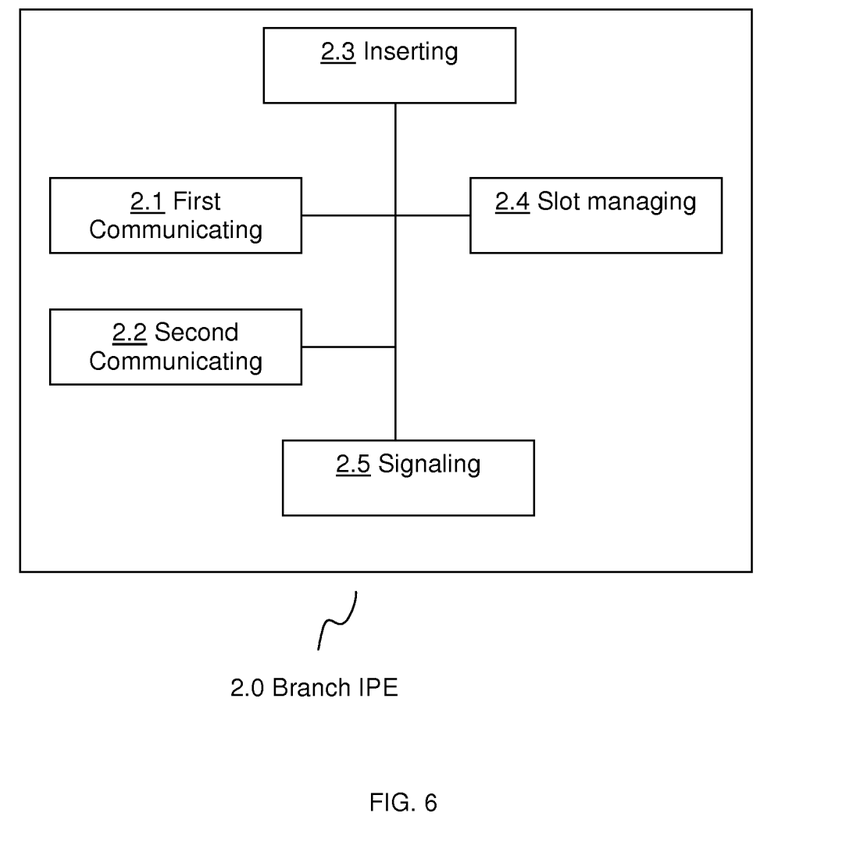
FIG. 6 is a block diagram of a branch IP Encapsulator device compliant with the embodiment.

In FIGS. 3 and 6, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of DVB-H distribution, but the invention is not limited to this particular environment and may be applied within other frameworks where content might be distributed in hierarchical manner.

Figure 4:
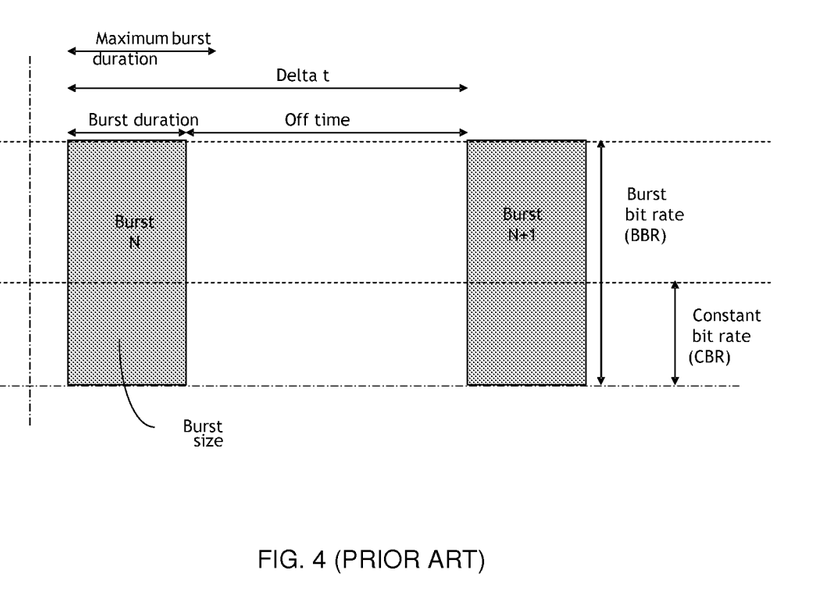
FIG. 4 illustrates a prior art DVB-H time slice organization.

The DVB-H time slicing setup according to the ETSI EN 301 192 standard is illustrated in FIG. 4. A packet is sent using high speed bursts with a period of several seconds, which is the burst duration. The burst size is the number of bits within a burst. The burst duration value is inferior or equal to the maximum burst duration. The maximum burst duration conforms to the standard field max_burst_duration field located in the Time Slice and FEC identifier descriptor. The Delta-t corresponds to the period between two successive bursts, Burst N and Burst N+1. The time between two bursts is the off time. The burst bit rate is higher than the constant bit rate. The bursts are sent in time slots. The set of time slots selected to send the bursts is a time slice.

Figure 5:
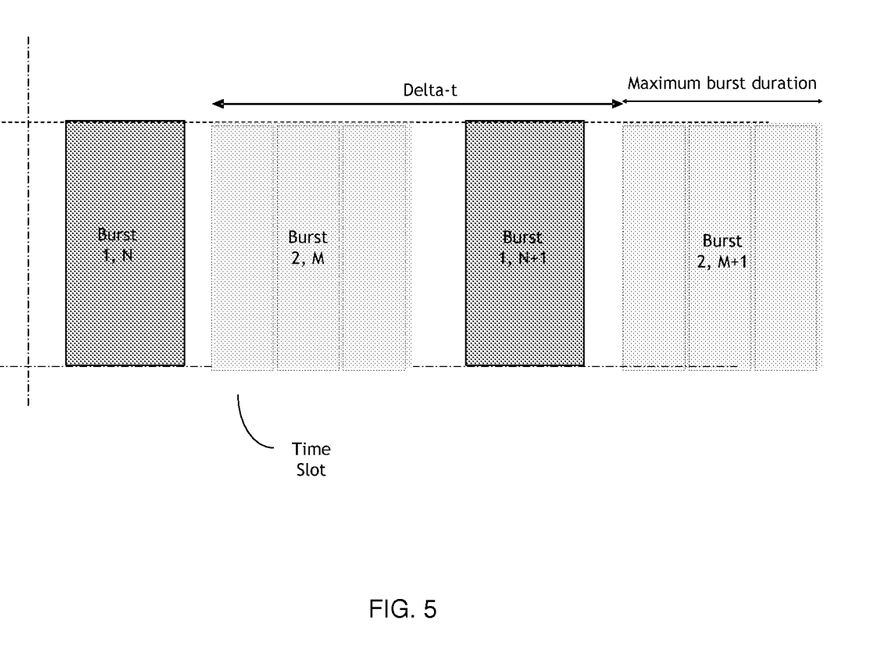
FIG. 5 illustrates a DVB-H time slice organization compliant with the embodiment.

The DVB-H time slicing according to the embodiment is depicted in FIG. 5. It shows a first time slice that comprises the set of Burst 1; where the successive Burst 1, N and Burst 1, N+1 are represented. A second time slice is represented, it comprises Burst 2; and successive Burst 2, M and Burst 2, M+1 are represented. The set of time slices is called the super time slice. The time slicing of the embodiment enables to send several sets of bursts. Only two time slices are represented in FIG. 5, of course the super time slice might comprise more than two time slices.

Figure 2:
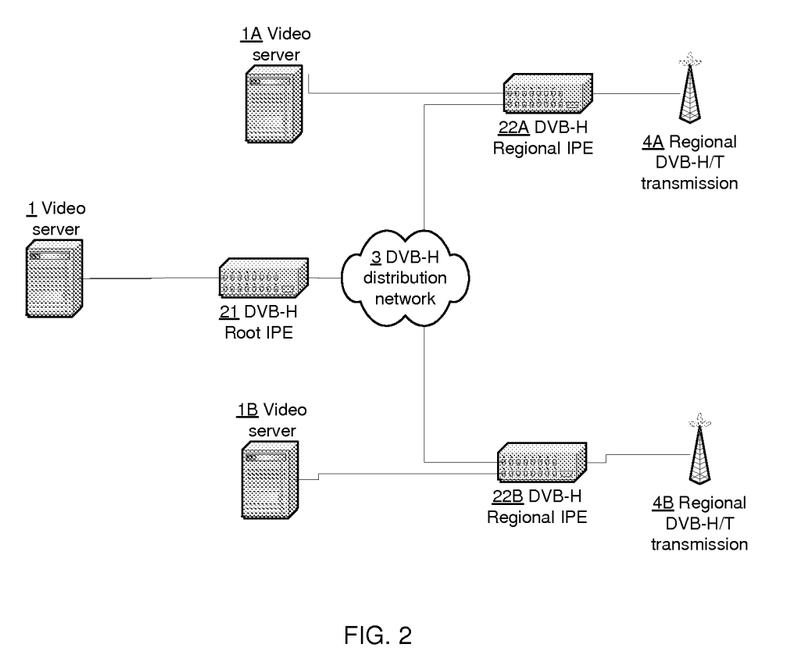
FIG. 2 is a block diagram of a system compliant with the embodiment.

The DVB-H distribution system according to the embodiment is illustrated in FIG. 2. Instead of having only one IPE, as in a standard DVB-H distribution system, the distribution system according to the embodiment comprises two layers of IPEs. The first layer is the root IPE 21. The second layer is the regional IPE 22A and 22B, which is a leaf IPE. Only two layers of IPEs are represented in FIG. 2. Of course the distribution system could comprise a plurality of layers, and a plurality of IPEs per layer. Each regional IPE is connected to a regional video server 1A, 1B. The regional servers are adapted to provide content to the regional IPE. Each regional IPE 22A, 22B then sends the DVB-H content to the DVB-H regional transmission system 4A, 4B through the regional DVB-H distribution networks not represented. It will be appreciated to the skilled in the art that a regional IPE is not necessarily connected to a video server. A regional IPE may also be connected to any type of content server or file server and more generally to any source of content that is inserted in the regional IPE.

As regards to the regional IPE, the root IPE is an upstream IPE. As regards to the root IPE, the regional IPE is a downstream IPE. The upstream IPE manages the super time slice. It further manages the time slots, in the super time slice, that can be used by the downstream IPEs. The upstream IPE reserves the super time slice to be used by its downstream IPEs. Reserving the time slices of the super time slice is done according to the DVB-H standard. The downstream IPE inserts content in the super time slice reserved by the upstream IPE. A downstream IPE may reserve in its super time slice another smaller or equivalent super time slice for its downstream IPEs as well. The upstream IPE may also insert content as well.

More generally, an IPE hierarchy is illustrated in FIG. 3. It comprises a root IPE 20 that is the IPE that defines the overall time slicing setup. The root IPE indicates to the immediate downstream IPEs the super time slice where they can send bursts. The IPE hierarchy also comprises branch IPEs 21.1, 21.2. A branch IPE is neither a root IPE nor a leaf IPE. In the IPE hierarchy, the branch is an IPE that is located between a root IPE and a leaf IPE. The leaf IPE 22.1, 22.2 is the last IPE in the hierarchy, before the DVB-H stream is sent into the air. It inserts its own stream in the reserved slots of the super time slice.

More generally, a branch IPE checks incoming DVB-H streams in order to detect the bursts for which the destination address corresponds to its own address. The branch IPE then reserves again all or part of the time slots for its downstream IPEs and/or uses part of the reserved slots for local insertion. A branch IPE performs the same functions as the root IPE but in the time slots that are indicated by its upstream IPE.

The IPEs according to the embodiment conform to the ETSI TR 102 469. In addition they comprise means for performing the encapsulation according to the embodiment.

In particular, the root IPE comprises means for defining the time slicing setup. It allocates slots to its downstream IPEs. It also comprises means for inserting data in the time slots.

The leaf IPE comprises means for inserting data in the allocated time slots.

The branch IPE comprises means for inserting data in the allocated time slots, and means for allocating time slots to its downstream IPEs from the time slot received from its upstream IPE.

The signaling between IPEs is performed with the IP/MAC Notification table (INT) that is defined in EN 301 192. The INT carries information on the location of IP/MAC streams within DVB networks. It describes the availability and location of IP/MAC streams. The INT comprises a "Time Slice and FEC" identifier descriptor that is located in the operational_descriptor_loop. The descriptor is used to bound the reserved downstream IPE super time slice.

According to a first method for signaling, the upstream IPE reserves as many as necessary consecutive time slices in order to fit with the super time slice reserved for the downstream IPE according to the section IP/MAC Notification Table of the EN 301 192. The set of consecutive time slices corresponds to a set of INT entries. For each entry, the target_ip_address_descriptor of the IP/MAC Notification Table corresponds to the IP address of a single downstream IPE or a group of downstream IPE. The value of the target_serial_number_descriptor is different for each time slice of a super time slice. Two consecutive time slices have consecutive value of target_serial_number_descriptor. There may be as many corresponding DVB-TS PIDs as consecutive time slices forming the super time slice.

The super time slice is either used by only one downstream IPE or a set of downstream IPEs. If used by a set of IPEs, a dedicated IP multicast group address is used; namely, several target_ip_address_descriptor fields are used.

The INT is first generated by an upstream IPE, to indicate the presence of reserved slots. A downstream IPE sees a reserved slot thanks to the target_ip_address_descriptor field that contains its own address or a well known dedicated multicast IP address. The downstream IPE then inserts content and modifies the INT; it deletes the target_ip_address_descriptor entries corresponding to its address or the well known dedicated multicast IP address.

According to a second method for signaling, a unique time slice that corresponds to the super time slice is reserved. It consists in defining only one entry in the INT. The "Time Slice and FEC identifier descriptor" of the ETSI EN 301 192 defines the frame_size, the max_average_rate and the max_burst_duration parameter values. Frame size is coded on 3 bits, and only 2 bits are used in the standard. According to the embodiment, the reserved values 4 to 7 are used to allow more values for the maximum burst size. Similarly, reserved values of the max_average_rate parameter are used to allow more values for the average rate.

The max_burst_duration is an 8 bits value that permits to signal a burst duration up to around five seconds. This is not sufficient for the super time slice or super burst. The resolution is 20 ms in the standard. In the embodiment, the resolution for the super burst is set to 100 ms. Of course it could be set to another value, that is higher than the 20 ms. The upstream IPE updates the frame_size and the max_average_rate parameters associated with the reserved super time slice. The upstream IPE calculates and sends MPE packets with reserved slots not filled.

A downstream IPE may ignore the "Time Slice and FEC identifier descriptor" parameters and rely on time slice parameters defined in the "real time parameters" section of the ETSI EN 301 192 standard. In particular it relies on delta-t value and frame boundary flag that are present within the MPE section header.

In general, considering that the downstream IPE should be aware of its allocated bandwidth and that battery saving is not a priority for an IPE, the latter may also continuously listen to the incoming DVB-H stream until it detects the first MPEG TS packets having a packet identifier (PID) corresponding to its super time slice (or super burst) according to the INT table. Once detected, it immediately starts replacement with its own MPEG TS packets transporting its local TV program to be inserted.

A branch IPE 2.0 is represented in FIG. 6. It comprises a first communicating module 2.1 for receiving the IP streams that are further inserted in the DVB-H stream. It comprises a second communicating module 2.2 for sending and receiving DVB-H streams at the DVB-H distribution network. The communication modules conform to the DVB-H standard. The branch IPE comprises an Inserting module 2.3 that is adapted to manage the local insertion of content in the time slots. The branch IPE comprises a Slot Managing module 2.4 that is adapted to manage the allocation of time slots for the downstream IPEs as described hereinabove. The branch IPE also comprises a signaling module 2.5 that is adapted to perform signaling to the downstream IPEs as described hereinabove.

The leaf IPE and the root IPE are not represented. They comprise the same modules as the branch IPE with the following differences. The leaf IPE does not comprise the signaling module of the branch IPE. The root IPE is a branch IPE where the communicating module comprises means for sending DVB-H streams at the DVB-H distribution network but not for receiving DVB-H streams.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. An upstream transmitting device belonging to a hierarchical distribution system of transmitting devices, said hierarchical distribution system having more than one layer of transmitting devices, each transmitting device of one layer communicating with transmitting devices of another layer over a first network and sending content over a first network in bursts in a channel comprising a plurality of bursts, said upstream transmitting device comprising:
   a first communicator which receives content from a second network,
   a second communicator which sends said content over said first network to at least a downstream transmitting device having a layer located downstream from said upstream transmitting device layer in the hierarchical distribution system, said content being successively sent over at least one time slot in a plurality of bursts of a channel, each burst containing at least one unfilled time slot;
   a slot manager which assigns said channel, and reserves at least one of said unfilled time slots of said plurality of bursts of said channel to said downstream transmitting device; and
   a signaler which indicates said assigned channel and said at least one reserved unfilled time slot of said plurality of bursts of said channel to said downstream transmitting device.

2. The upstream transmitting device according to claim 1, wherein each of said transmitting devices of said hierarchical distribution system comprises a DVB-H IP Encapsulator, and said first network is a DVB-H network.

3. The upstream transmitting device according to claim 2, wherein said second communicator transmits content using a DVB-H time slicing technique.

4. The upstream transmitting device according to claim 2, wherein said first communicator receives said first content over the Internet Protocol.

5. A transmitting device belonging to a hierarchical distribution system of transmitting devices, said hierarchical distribution system having more than one layer of transmitting devices, each transmitting device of one layer communicating with transmitting devices of another layer over a first network and sending content over said first network in bursts comprising at least one time slot in a channel comprising a plurality of bursts the transmitting device comprising:
   a slot manager which is being assigned a channel and at least one reserved unfilled time slot in a plurality of bursts of said channel from an upstream transmitting device having a layer located upstream from said transmitting device layer in said hierarchical distribution system;
   a first communicator which receives a first content from a second network;
   an inserter which inserts said first content in a first part of said at least one reserved unfilled time slot of said plurality of bursts of said assigned channel; and
   a second communicator which sends over said first network said plurality of bursts of said assigned channel to at least a downstream transmitting device having a layer located downstream from said transmitting device layer in said hierarchical distribution system.

6. The transmitting device according to claim 5, wherein said second communicator further receives a second content from said upstream transmitting device over said first network, and forwards said second content to said at least one downstream transmitting device, said second content being sent over said plurality of bursts of said channel.

7. The transmitting device according to claim 5 wherein, said slot manager further reserves at least a second part of said at least one unfilled time slot of said plurality of bursts of said assigned channel to said at least one downstream transmitting device; and
   said transmitting device further comprises a signaler which indicates said assigned channel and said reserved second part of said at least one unfilled time slot of said plurality of bursts of said assigned channel to said at least one downstream transmitting device.

8. The upstream transmitting device to claim 5, wherein each of said transmitting devices of said hierarchical distribution system comprises a DVB-H IP Encapsulator, and said first network is a DVB-H network.

9. The transmitting device according to claim 8, wherein said second communicator transmits content using a DVB-H time slicing technique.

10. The transmitting device according to claim 5, wherein said first communicator receives said first content over the Internet Protocol.

11. An upstream transmitting device belonging to a hierarchical distribution system of transmitting devices, said hierarchical distribution system comprising more than one layer of transmitting devices, each transmitting device of one layer of said distribution system communicating with transmitting devices of another layer of said distribution system over a first network and sending content over said first network in bursts comprising at least one time slot, in a channel comprising a plurality of bursts, the upstream transmitting device comprising:
   a first communicator which receives a content from a second network;
   a second communicator which sends said content over said first network to at least a downstream transmitting device having a layer located downstream from said transmitting device layer in said hierarchical distribution system, said content being successively sent over at least one time slot of a plurality of bursts of a channel, each burst containing at least one unfilled time slot;
   a slot manager which assigns said channel, and reserves at least one of said unfilled time slots of said plurality of bursts of said channel to said downstream transmitting device; and
   a signaler which indicates said assigned channel and said reserved unfilled time slots of said plurality of bursts of said channel to said at least one downstream transmitting device, said signaler further sending a descriptor of boundaries of the reserved time slot in said plurality of bursts to said at least one downstream transmitting device.

12. The upstream transmitting device to claim 11, wherein each of said transmitting devices of said hierarchical distribution system comprises a DVB-H IP Encapsulator, and said first network is a DVB-H network.

13. The upstream transmitting device according to claim 12, wherein said second communicator transmits content using a DVB-H time slicing technique.

14. The upstream transmitting device according to claim 11, wherein said first communicator receives said content over the Internet Protocol.

15. A transmitting device belonging to a hierarchical distribution system of transmitting devices, said hierarchical distribution system comprising more than one layer of transmitting devices, each transmitting device of one layer of said distribution system communicating with transmitting devices of another layer of said distribution system over a first network and sending content in bursts comprising at least one time slot, in a channel comprising a plurality of bursts, over said first network, the transmitting device comprising:
   a slot manager which is being assigned a channel and at least one reserved unfilled time slot in a plurality of bursts of said channel from an upstream transmitting device having a layer located upstream from said transmitting device layer in said hierarchical distribution system, said assignment being performed according to a descriptor of boundaries of said reserved time slots received from said upstream transmitting device;
   a first communicator which receives a first content from a second network;
   an inserter which inserts said first content in a first part of said at least one reserved unfilled time slot of said plurality of bursts of said assigned channel; and
   a second communicator which sends said plurality of bursts of said assigned channel to at least a downstream transmitting device having a layer located downstream from said transmitting device layer in said hierarchical distribution system over said first network.

16. A transmitting device according to claim 15, wherein said slot manager further reserves at least a second part of said at least one unfilled time slot of said plurality of bursts of said assigned channel to said at least one downstream transmitting device; and
   said transmitting device further comprises a signaler which indicates said assigned channel and said reserved second part of said at least one unfilled time slot of said plurality of bursts of said assigned channel to said at least one downstream transmitting device, said signaler further sending to said at least one downstream transmitting device a descriptor of the boundaries of said reserved second part of said at least one unfilled time slot in said plurality of bursts.

17. The transmitting device according to claim 15, wherein each of said transmitting devices of said hierarchical distribution system comprises a DVB-H IP Encapsulator, and said first network is a DVB-H network.

18. The transmitting device according to claim 17, wherein said second communicator transmits content using a DVB-H time slicing technique.

19. The transmitting device according to claim 15, wherein said first communicator receives said first content over the Internet Protocol.

20. The transmitting device according to claim 15, wherein said second communicator further receives a second content from said upstream transmitting device over said first network, and forwards said second content to said at least one downstream transmitting device, said second content being sent over said plurality of bursts of said channel.

21. A transmitting method to be performed in an upstream transmitting device belonging to a hierarchical distribution system of transmitting devices, said hierarchical distribution system having more than one layer of transmitting devices, each transmitting device of one layer communicating with transmitting devices of another layer over a first network and sending content over said first network in bursts in a channel comprising a plurality of bursts, said transmitting method comprising:
   receiving content from a second network,
   sending said content over said first network to at least a downstream transmitting device having a layer located downstream from said upstream transmitting device layer in the hierarchical distribution system, said content being successively sent over at least one time slot in a plurality of bursts of a channel, each burst containing at least one unfilled time slot;
   assigning said channel and reserving of at least one of said unfilled time slots of said plurality of bursts of said channel to said downstream transmitting device; and
   indicating said assigned channel and said at least one reserved unfilled time slot of said plurality of bursts of said channel to said downstream transmitting device.

22. The transmitting method according to claim 21, wherein each of said transmitting devices of said hierarchical distribution system comprises a DVB-H IP Encapsulator, and said first network is a DVB-H network.

23. The transmitting method according to claim 22, wherein said sending of said content uses a DVB-H time slicing technique.

24. The transmitting method according to claim 21, wherein said received content is received over the Internet Protocol.

25. A transmitting method to be performed on a transmitting device belonging to a hierarchical distribution system of transmitting devices, said hierarchical distribution system having more than one layer of transmitting devices, each transmitting device of one layer communicating with transmitting devices of another layer over a first network and sending content over said first network in bursts comprising at least one time slot in a channel comprising a plurality of bursts, said transmitting method comprising:
   assigning a channel and at least one reserved unfilled time slot in a plurality of bursts of said channel from an upstream transmitting device having a layer located upstream from said transmitting device layer in said hierarchical distribution system;
   receiving a first content from a first network;
   inserting said first content in a first part of said at least one reserved unfilled time slot said plurality of bursts of said assigned channel; and
   sending over said first network said plurality of bursts of said assigned channel to at least a downstream transmitting device having a layer located downstream from said transmitting device layer in said hierarchical distribution system.

26. The transmitting method according to claim 25, wherein each of said transmitting devices of said hierarchical distribution system comprises a DVB-H IP Encapsulator, and said first network is a DVB-H network.

27. The transmitting method according to claim 26, wherein said sending of said first content uses a DVB-H time slicing technique.

28. The transmitting method according to claim 25, wherein said received first content is received over the Internet Protocol.

29. The transmitting method according to claim 25, wherein said transmitting method further comprises:
   receiving a second content from said upstream transmitting device over said first network, and
   forwarding said second content to said at least one downstream transmitting device, said second content being sent over said plurality of bursts of said channel.

30. The transmitting method according to claim 25 wherein said transmitting method further comprises:
reserving at least a second part of said at least one unfilled time slot of said plurality of bursts of said assigned channel to said at least one downstream transmitting device; and
indicating said assigned channel and said reserved second part of said at least one unfilled time slot of said plurality of bursts of said assigned channel to said at least one downstream transmitting device.

31. A transmitting method to be performed on an upstream transmitting device belonging to a hierarchical distribution system of transmitting devices, said hierarchical distribution system comprising more than one layer of transmitting devices, each transmitting device of one layer of said distribution system communicating with transmitting devices of another layer of said distribution system over a first network and sending content over said first network in bursts comprising at least one time slot, in a channel comprising a plurality of bursts, said transmitting method comprising:
receiving a content from a second network;
sending said content over said first network to at least a downstream transmitting device having a layer located downstream from said upstream transmitting device layer in said hierarchical distribution system, said content being successively sent over at least one time slot of a plurality of bursts of a channel, each burst containing at least one unfilled time slot;
assigning said channel and reserving at least one of said unfilled time slots of said plurality of bursts of said channel to said downstream transmitting device; and
indicating said assigned channel and said reserved unfilled time slots of said plurality of bursts of said channel to said at least one downstream transmitting device, said indicating further comprising sending a descriptor of boundaries of the reserved time slot in said plurality of bursts to said at least one downstream transmitting device.

32. The transmitting method according to claim 31, wherein each of said transmitting devices of said hierarchical distribution system comprises a DVB-H IP Encapsulator, and said first network is a DVB-H network.

33. The transmitting method according to claim 32, wherein said sending of said content uses a DVB-H time slicing technique.

34. The transmitting method according to claim 31, wherein said received content is received over the Internet Protocol.

35. A transmitting method to be performed on a transmitting device belonging to a hierarchical distribution system of transmitting devices, said hierarchical distribution system comprising more than one layer of transmitting devices, each transmitting device of one layer of said distribution system communicating with transmitting devices of another layer of said distribution system over a first network and sending content in bursts comprising at least one time slot, in a channel comprising a plurality of bursts, over said first network, the transmitting method comprising:
assigning a channel and at least one reserved unfilled time slot in a plurality of bursts of said channel from an upstream transmitting device having a layer located upstream from said transmitting device layer in said hierarchical distribution system, said assigning being performed according to a descriptor of boundaries of said reserved time slots received from said upstream transmitting device;
receiving a first content from a second network;
inserting said first content in a first part of said at least one reserved unfilled time slot of said plurality of bursts of said assigned channel; and
sending said plurality of bursts of said assigned channel to at least a downstream transmitting device having a layer located downstream from said transmitting device layer in said hierarchical distribution system over said first network.

36. The transmitting method according to claim 35, wherein each of said transmitting devices of said hierarchical distribution system comprises a DVB-H IP Encapsulator, and said first network is a DVB-H network.

37. The transmitting method according to claim 36, wherein said sending of said content uses a DVB-H time slicing technique.

38. The transmitting method according to claim 35, wherein said received first content is received over the Internet Protocol.

39. The transmitting method according to claim 35, wherein said receiving further comprises receiving a second content from said upstream transmitting device over said first network, and forwarding said second content to said at least one downstream transmitting device, said second content being sent over said plurality of bursts of said channel.

40. The transmitting method according to claim 35 wherein said assigning further comprises:
reserving at least a second part of said at least one unfilled time slot of said plurality of bursts of said assigned channel to said at least one downstream transmitting device; and
indicating said assigned channel and said reserved second part of said at least one unfilled time slot of said plurality of bursts of said assigned channel to said at least one downstream transmitting device, said indicating further comprising sending to said at least one downstream transmitting device a descriptor of the boundaries of said reserved second part of said at least one unfilled time slot in said plurality of bursts.

* * * * *